United States Patent [19]
Woo

[11] Patent Number: 5,458,940
[45] Date of Patent: Oct. 17, 1995

[54] OPTICAL DISK WITH VIBRATION DAMPENING

[75] Inventor: Edward J. Woo, Woodbury, Minn.

[73] Assignee: Minnesota Mining and Manufacturing Company, St. Paul, Minn.

[21] Appl. No.: 197,374

[22] Filed: Feb. 16, 1994

Related U.S. Application Data

[63] Continuation of Ser. No. 678,220, Apr. 1, 1991, abandoned.

[51] Int. Cl.[6] ............................... B32B 3/02; G11B 5/66; C09J 5/02
[52] U.S. Cl. .................... 428/64.3; 428/694 ML; 428/900; 428/480; 428/522; 428/332; 369/283; 360/135; 156/325; 156/326; 156/327; 156/332
[58] Field of Search ............................... 428/65, 332, 64, 428/480, 694 ML, 522, 900; 360/135; 369/283; 156/325, 326, 327, 332

[56] References Cited

U.S. PATENT DOCUMENTS

| 4,569,881 | 2/1986 | Freese et al. | 428/213 |
| 4,615,944 | 10/1986 | Gardner | 428/332 |
| 4,652,498 | 3/1987 | Wolf et al. | 428/461 |
| 4,870,429 | 9/1989 | Fujita et al. | 346/137 |

FOREIGN PATENT DOCUMENTS 0373763  6/1990  European Pat. Off. .

Primary Examiner—L. Kiliman
Attorney, Agent, or Firm—Gary L. Griswold; Walter N. Kirn; Eric D. Levinson

[57] ABSTRACT

A single recording side magneto-optic disk has improved dampening characteristics for rotation at high speeds such as 3,000 rpm or greater. A dampening layer is secured to the recording side. The dampening layer includes a film of at least approximately 102 micrometers in thickness attached to the disk by an adhesive layer of at least 25.4 micrometers in thickness.

6 Claims, 3 Drawing Sheets

OPTICAL DISK WITH VIBRATION DAMPENING

This is a continuation of application No. 07/678,220 filed Apr. 1, 1991.

BACKGROUND OF THE INVENTION

The present invention relates to optical disks, and in particular, it relates to single-sided optical disks for rotation at high speeds.

Presently, single-sided optical disks for use in computers are read at rotational speeds of approximately 2,400 revolutions per minute (rpm). There is a trend in the industry to access the data on such disks more quickly. In order to do so, higher rotational speeds are needed. Recently, manufacturers of optical disk readers have announced readers that access such disks at rotational speeds of between 3,000 and 3,600 rpm.

It has been found that single-sided disks, when rotated at rotational speeds above 3,000 rpm have vibrational problems. The vibrational problems cause the disks to wobble, which in turn results in tracking problems for the laser in the optical disk reader.

Single-sided disks are disposed in cartridges, such as described in the Muehlhausen et al U.S. Pat. No. 4,943,880. Preliminary ANSI specifications exist for such single-sided disks and the cartridges containing these disks. The ANSI specifications require that such disks be 86 mm in diameter and be no more than 1.4 mm thick with the disk substrate being no more than 1.2 mm thick.

Published European Patent Application 0 373 763 describes the use of a relatively thin polyester film of 0.002 inches (50.8 micrometers) thickness adhesively secured to a compact disk. The film is in the form of a single annular ring that is secured to the disk with a transparent layer of flexible acrylic polymer adhesive. The purpose of the film is not to dampen vibrations due to high rotational speeds, since compact disks rotate at relatively low speeds, typically in the range of 300 rpm. The film and adhesive layer act as an energy absorption element to absorb vibrational energy caused by slippage of the disk. The polyester film is used to absorb such vibrations caused by the slippage of the disk.

The Fujita et al U.S. Pat. No. 4,870,429 describes a disk structure which includes two sheets of substrate bonded to each other with a spacer interposed between the two substrates to restrict vibrations caused by resonance. The spacer is made from an elastomeric foam material and is positioned between the two substrates to dampen the vibrations.

SUMMARY OF THE INVENTION

The present invention includes a magneto-optic disk having a single recording side and a dampening layer positioned on the recording side. The dampening layer includes a polyester film layer of at least approximately 102 micrometers thick attached to the disk by an adhesive layer of at least approximately 25 micrometers thick.

The present invention also includes a method for dampening vibrations of a single recording side of a magneto-optic disk at a vibrational frequency of at least 850 HZ. The method includes applying a dampening layer to the single recording side. The dampening layer comprises an adhesive layer and a film layer secured by the adhesive layer and made of a material selected from the group consisting of polyester, polyimide, and aluminum foil.

DETAILED DESCRIPTION OF THE PREFERRED EMBODIMENTS

Figure 1:
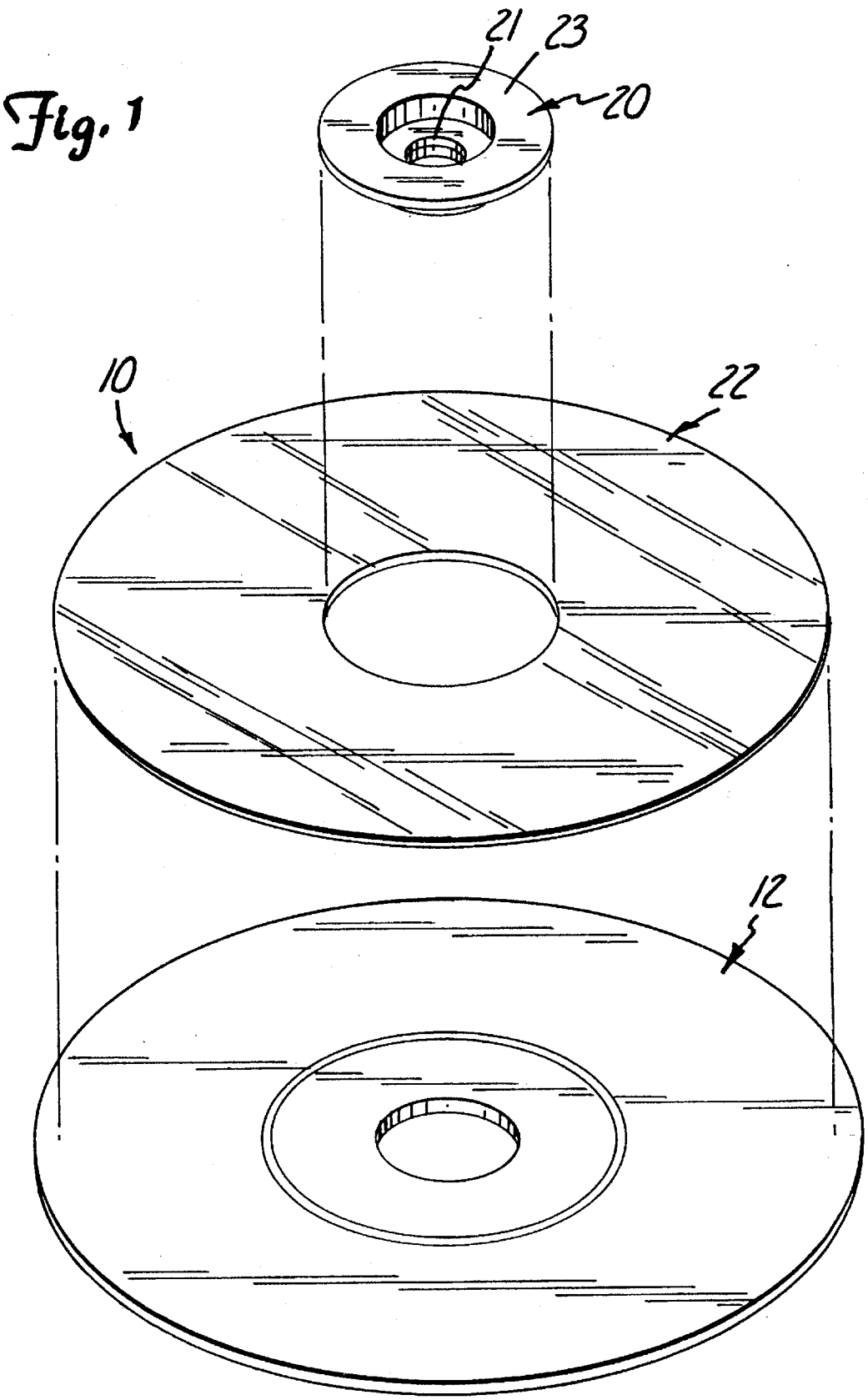
FIG. 1 is an exploded perspective view of the disk of the present invention.
Figure 2:
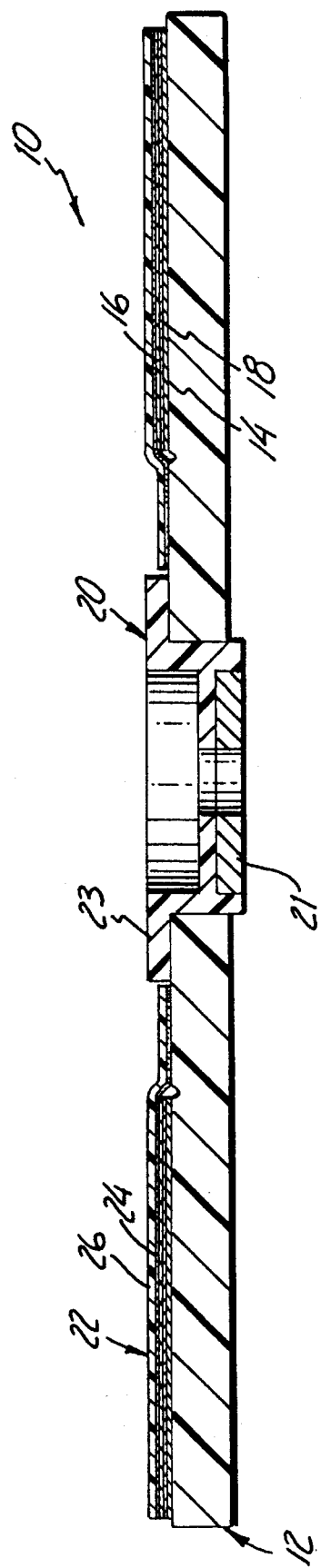
FIG. 2 is a cross-sectional view of the disk of the present invention.

A magneto-optic disk of the present invention is generally indicated at 10 in FIGS. 1 and 2. The disk 10 includes a substrate 12 on which a magneto-optic film layer 14 is deposited. Substrate materials suitable for use in the present invention include polymethylmethacrylate, polycarbonate, or polyester. Other substrates, such as are listed in Freese et al U.S. Pat. No. 4,569,881, are also within the scope of the present invention.

Magneto-optic film layers 14 suitable for use in the present invention are well known in the art. Magneto-optic thin film recording media and deposition processes are described in the Freese et al U.S. Pat. No. 4,569,881 and the Gardner U.S. Pat. Nos. 4,615,944 and 4,684,454. Preferably, a polycarbonate disk substrate is coated with the magneto-optic thin film layer. A reflective layer 16 is then deposited on the magnetooptic thin film recording layer and a scratch-resistant coating 18 such as UV-curable acrylate coating is then deposited on the reflective layer 16.

A dampening layer 22 is secured to the substrate 12 on the recording side containing the magneto-optic film layer 14, with the magneto-optic film layer positioned between the substrate and dampening layer as shown in FIG. 2. The dampening layer 22 includes an adhesive layer 24 and a polymeric film layer 26 secured to the substrate 12 by the adhesive layer 24.

A hub 20 is then applied to the disk in a manner that is well known in the art. The hub 20 includes a metal centering disk 21 embedded within a polymeric (e.g. polycarbonate) flange portion 23. The flange portion 23 is secured to the substrate 12.

It has been found that 86 mm diameter magnetooptic disks experience a vibration problem sufficient to cause laser tracking difficulties in the reader. Vibrational studies indicate that 86 mm diameter magneto-optic disks contain high vibrational amplitude at approximately 1,150 HZ for the second order vibration. It has been found that a layer of adhesive along with a film layer dampens the vibrational amplitude sufficiently so that tracking difficulties experienced by the reader laser are eliminated. Suitable film material includes aluminum foil, polyester such as polyethylene terephthalate (PET), polyimide, and other film polymers. A preferred film layer is polyethylene terephthalate. Preferably, the film layer is at least 102 micrometers in thickness, and the adhesive layer is at least 25.4 micrometers in thickness.

Tables 1A and 1B set forth below illustrate the vibrational dampening effect of the present invention. Various adhesives are utilized in association with a 102 micrometers thick polyethylene terephthalate film, as compared to an optical disk with no adhesive and no film backing. Each value set forth in Tables 1A and 1B is the mean value of three disks that were tested. Each disk was secured on to the center of a shaker table (Exciter Body Type 4A05 with general purpose exciter head Type 4812 made by Bruet Kjaer Company of Switzerland) and the vibrational force from the shaker table is transmitted into the disks through the metal hub plate of the disk. It is believed that the vibrational frequency resulting from the shaker table corresponds to the same vibrational frequency that occurs at a rotational speed of at least 3,000 rpm. No plastic portion of the disk is touched by the shaker table. A Hewlett-Packard Model 3582A Spectrum analyzer was used to record the vibrational frequency.

The vibrational frequency and the peak amplitude were recorded both at an inner diameter disk position of 25 mm and at an outer diameter disk position of 40 mm. As will be noted from Tables 1A and 1B, in each case, the peak amplitude at the 40 mm outer diameter position was reduced by more than one-half. In all cases, at the inner diameter position of 25 mm, the peak amplitude was reduced significantly. In several cases, such as samples 2, 3, 6, 7, and 9, the peak amplitude was reduced by more than two-thirds.

TABLE 1A

|  |  |  | At Disk Diameter of 25 mm | |
|---|---|---|---|---|
| Sample | Adhesive | Adhesive Thickness (Micrometers) | Peak Amplitude M.V. | Vibrational Frequency HZ |
| 1 | No Adhesive | No Adhesive | 177 | 1,150 |
| 2 | Isooctylacrylate-Acrylic Acid[1] | 61 | 55 | 1,200 |
| 3 | Isooctylacrylate-Acrylic Acid[1] | 123 | 50 | 1,230 |
| 4 | Isooctylacrylate-Acrylamide[2] | 53 | 120 | 1,220 |
| 5 | Isooctylacrylate-Acrylic Acid[3] | 13 | 110 | 1,220 |
| 6 | Isooctylacrylate-Acrylic Acid[3] | 30–50 | 57 | 1,200 |
| 7 | Isooctylacrylate-Acrylic Acid[3] | 43 | 46 | 1,200 |
| 8 | Polystyrene-Polyisobutelene[4] | 76 | 110 | 1,360 |
| 9 | Polystyrene-Polyisobutelene[4] Isooctylacrylate-Acrylic Acid[3] | 73–13 | 40 | 1,200 |

TABLE 1B

|  |  |  | At Disk Diameter of 40 mm | |
|---|---|---|---|---|
| Sample | Adhesive | Adhesive Thickness (Micrometers) | Peak Amplitude M.V. | Vibrational Frequency HZ |
| 1 | No Adhesive | No Adhesive | <50 | 850–1,400 |
| 2 | Isooctylacrylate-Acrylic Acid[1] | 61 | <20 | 850–1,400 |
| 3 | Isooctylacrylate-Acrylic Acid[1] | 123 | <20 | 850–1,400 |
| 4 | Isooctylacrylate-Acrylamide[2] | 53 | <20 | 850–1,400 |
| 5 | Isooctylacrylate-Acrylic Acid[3] | 13 | <20 | 850–1,400 |
| 6 | Isooctylacrylate-Acrylic Acid[3] | 30–50 | <20 | 850–1,400 |
| 7 | Isooctylacrylate- | 43 | <20 | 850–1,400 |

TABLE 1B-continued

| | | | At Disk Diameter of 40 mm | |
|---|---|---|---|---|
| Sample | Adhesive | Adhesive Thickness (Micrometers) | Peak Amplitude M.V. | Vibrational Frequency HZ |
| 8 | Acrylic Acid[3] Polystyrene-Polyisobutelene[4] | 76 | <20 | 850–1,400 |
| 9 | Polystyrene-Polyisobutelene[4] Isooctylacrylate-Acrylic Acid[3] | 76–13 | <20 | 850–1,400 |

[1] An Isooctylacrylate - Acrylic Acid Copolymer Cross-linked by U.V. Light, Manufactured by Minnesota Mining and Manufacturing Company of Saint Paul, Minnesota.
[2] An Isooctylacrylate - Acrylamide Copolymer Cross-linked by U.V. Light, Manufactured by Minnesota Mining and Manufacturing Company of Saint Paul, Minnesota.
[3] An Isooctylacrylate - Acrylic Acid Copolymer Polymerized in Ethylacetate, Manufactured by Minnesota Mining and Manufacturing Company of Saint Paul, Minnesota.
[4] A Hot Melt Adhesive, Manufactured by ACI Japan Ltd.

All test samples exhibited some low frequency vibrations at 150 to 250 HZ. However, such low frequency vibrations do not contribute any serious difficulty for proper laser tracking of the disk. It is only at higher frequencies, such as 850 to 4,500 HZ, that laser tracking problems occur. In addition to the reduction of the peak amplitude, only shallow and broad peaks were found in these samples.

Figure 3:
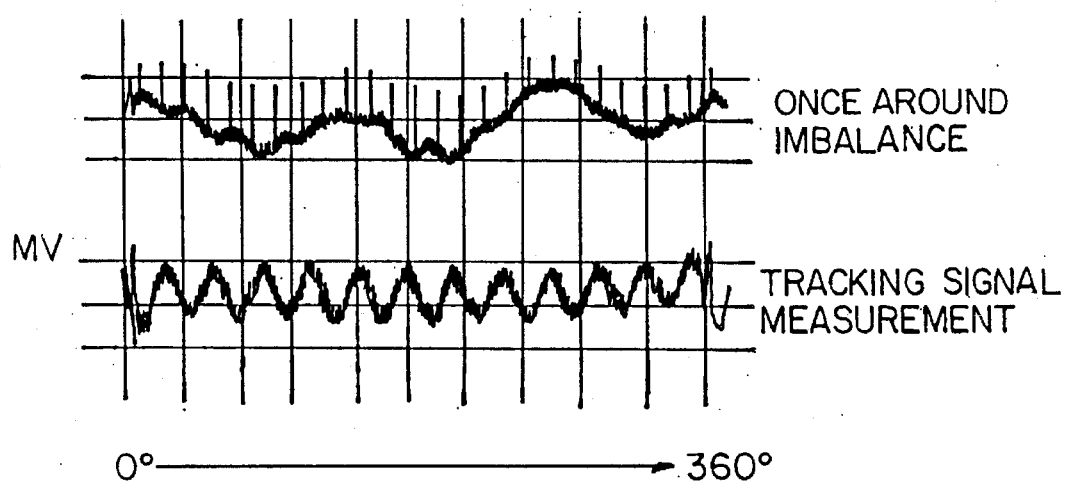
FIG. 3 is a graphical view of the imbalance and laser tracking characteristics of an undampened magneto-optic disk.
Figure 4:
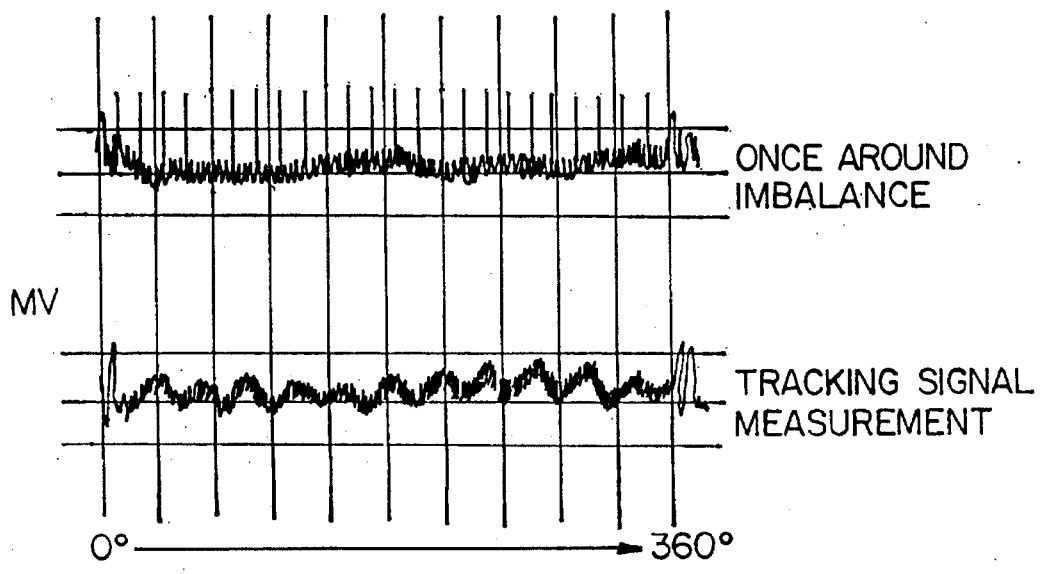
FIG. 4 is a graphical view of the imbalance and laser tracking characteristics of a magneto-optic disk dampened utilizing the present invention.

In FIGS. 3 and 4, a further comparison is illustrated between an undampened disk and a disk dampened utilizing the present invention. The disk tested in FIG. 4 includes an adhesive layer of isooctylacrylate - acrylic acid adhesive polymerized in ethylacetate manufactured by Minnesota Mining and Manufacturing Company of Saint Paul, Min., approximately 43 micrometers thick and a PET film layer of approximately 102 micrometers thick secured to the substrate by the adhesive. Both disks were evaluated utilizing a SEIKA tester manufactured by Pulstech of Japan. Both disks were spun at 3,600 rpm and measurements were taken at an inner diameter of approximately 24 mm.

The top curve illustrated in FIGS. 3 and 4 is a once around imbalance property of each disk. The imbalance property (a term known in the optical disk field) is measured from the difference between the signals from the two read detectors of the disk drive of the SEIKA tester and the top curves are a qualitative presentation of the imbalance property. The bottom curve in each figure is a tracking signal measurement which reflects the ability of the read detectors of the disk drive to stay within a track in the disk. The smoother the bottom curve, the better the tracking. The horizontal axis in FIGS. 3 and 4 is 0° to 360° (one revolution), and the vertical axis is in millivolts (mv). It is desirable to reduce the damping ratio, that is the peak height divided by the peak width for peaks on the bottom curve. As is readily apparent from a comparison of FIGS. 3 and 4, the damping ratio is improved utilizing the dampening mechanism of the present invention.

Table 2 illustrates the results of tests run on various samples in which the adhesive layer thickness was kept constant at 43 micrometers, while the characteristics of the PET film layer including thickness were varied. The samples of Table 2 were analyzed according to the same procedure and using the same equipment as the samples of Table 1A and 1B. As the results of Table 2 clearly indicate, the peak amplitude was greatly reduced when compared to the control.

TABLE 2

| | | | At Disk Diameter of 25 mm | |
|---|---|---|---|---|
| Sample | Adhesive | Film Layer Thickness (Micrometers) | Peak Amplitude M.V. | Vibrational Frequency HZ |
| 1 | No Adhesive | No Film | 193 | 1,070 |
| 2 | Isooctylacrylate-Acrylic Acid[1] | 127 PET With TiO$_2$ | 42–53 | 1,110 |
| 3 | Isooctylacrylate-Acrylic Acid[1] | 102 PET | 58–68 | 1,060 |
| 4 | Isooctylacrylate-Acrylic Acid[1] | 127 PET With Matt Finish | 29–30 | 1,080 |
| 5 | Isooctylacrylate-Acrylic Acid[1] | 178 PET | 46–54 | 1,280 |
| 6 | Isooctylacrylate (96%)-Methylmethacrylic Acid (4%)[2] | 102 PET | 50–60 | 1,180 |

[1] An Isooctylacrylate - Acrylic Acid Adhesive Polymerized in Ethylacetate, Manufactured by Minnesota Mining and Manufacturing Company.

TABLE 2-continued

|  |  | | At Disk Diameter of 25 mm | |
|---|---|---|---|---|
| Sample | Adhesive | Film Layer Thickness (Micrometers) | Peak Amplitude M.V. | Vibrational Frequency HZ |

[2] A Hot Melt Adhesive, Manufactured by Minnesota Mining and Manufacturing Company of Saint Paul, Minnesota, is an Isooctylacrylate - Methylmethacrylic Copolymer Polymerized in Water and Coated on to the Film Layer by High Temperature Melt Processing.

An additional set of disks were characterized on which thinner layers of PET were utilized. The samples were analyzed in the same manner using the same equipment as was used for the samples of Tables 1A and 1B. The adhesive used in samples 2, 3, 6, and 7 of Table 3 is an isooctylacrylate - acrylic acid copolymer polymerized in ethylacetate manufactured by Minnesota Mining and Manufacturing Company of Saint Paul, Minn. The adhesive used in samples 4 and 5 is an isooctylacrylate - acrylic acid copolymer cross-linked by U.V. light manufactured by Minnesota Mining and Manufacturing Company of Saint Paul, Minn. As Table 3 indicates, PET thicknesses of 25.4 and 50.8 micrometers provide much less dampening effect than PET thicknesses of 127 micrometers.

TABLE 3

|  |  |  | At Disk Diameter of 25 mm | |
|---|---|---|---|---|
| Sample | PET Film Thickness (Micrometers) | Adhesive Thickness (Micrometers) | Peak Amplitude M.V. | Vibrational Frequency HZ |
| 1 - Control | None | None | 208 | 1,070 |
| 2 | 25.4 | 43 | 155–162 | 1,130 |
| 3 | 50.8 | 43 | 133–142 | 1,180 |
| 4 | 76 | 61 | 107 | 1,160 |
| 5 | 102 | 61 | 50 | 1,200 |
| 6 | 127 Plain | 43 | 68 | 1,150 |
| 7 | 127 With Matt Finish | 38 | 44–47 | 1,170 |

In applying the PET film layer, care has to be taken to avoid trapping air between the film layer and the substrate. In a preferred method of applying the film, the film layer is die cut in an annular form from a web of adhesive coated polyester film having a protective lining. The die cut film is placed on a DELRIN polymer (I.E, Dupont de Nemours and Co. of Delaware) platform. The platform is an annulus in a slight frusto conical configuration and is resiliently movable to a flat position. The platform is supported by metal and includes a plurality of vacuum holes so that the film can be secured to the platform. A stand extends from the center of the platform which initially supports the disk substrate and centers the disk with respect to the film.

A vacuum is initiated through the platform to secure the film in place. The liner is then removed from the film, exposing the adhesive. The disk substrate with the scratch resistant coating facing the adhesive is placed on the center stand. A vacuum pulls the center stand downwardly to initiate preliminary contact with the adhesive on the film. A hydraulically operated press then forces the disk substrate against the adhesive and film and DELRIN platform. The force flattens the DELRIN form thereby removing air starting from an inside diameter position and moving outwardly to expel the air that might otherwise become trapped. A force of approximately 138 kilo pascals is used to force the disk substrate against the DELRIN platform.

After the dampening layer has been attached to the disk substrate, the hub 20 is attached to the disk substrate with a U.V. curable adhesive preferably using a Matusi Hub-602A applied apparatus known to the art.

In choosing materials for the dampening mechanism of the present invention, care must be used in considering materials that have no corrosive properties to the magneto-optic film layer. For example, adhesives having a chloride content should be avoided. Such adhesives can produce pin holes in the magneto-optic film layer. Table 4 set forth below characterizes by ion chromatography chloride content in parts per million of the adhesives listed in Tables 1A and 1B.

The samples in Table 4, after the chloride content had been characterized, were stressed in an oven at 80° C. at 85 percent relative humidity for a period of 1,500 hours. As indicated in Table 3, a chloride content greater than 1.5 parts per million produce pin holes in the magnetooptic film layer.

TABLE 4

| Sample | Adhesive | Chloride Content (PPM) | Corrosion* (1,500 Hours) |
|---|---|---|---|
| 1 | Isooctylacrylate - Acrylic Acid[1] | 1.7–2.1 | Corrosion at Outer Edge and Pinhole |
| 2 | Isooctylacrylate - Acrylamide[2] | 0.96–1.5 | None |
| 3 | Isooctylacrylate - Acrylic Acid[3] | 0.8–0.9 | None |
| 4 | Polystyrene - Polyisobutelene (Hot Melt Adhesive)[4] | 0.45 | None |

*The disks are examined by both microscopic method and visual inspection.

TABLE 4-continued

| Sample | Adhesive | Chloride Content (PPM) | Corrosion* (1,500 Hours) |
|---|---|---|---|

[1] A Pressure Sensitive Adhesive, Manufactured by Minnesota Mining and Manufacturing Company of Saint Paul, Minnesota, is an Isooctylacrylate - Acrylic Acid Copolymer Cross-linked by U.V. Light.
[2] An Isooctylacrylate - Acrylamide Copolymer Cross-linked by U.V. Light, Manufactured by Minnesota Mining and Manufacturing Company of Saint Paul, Minnesota.
[3] An Isooctylacrylate - Acrylic Acid Copolymer Polymerized in Ethylacetate, Manufactured by Minnesota Mining and Manufacturing Company of Saint Paul, Minnesota.
[4] A Hot Melt Adhesive, Manufactured by ACI Japan Ltd.

Although the present invention has been described with reference to preferred embodiments, workers skilled in the art will recognize that changes may be made in form and detail without departing from the spirit and scope of the invention.

What is claimed is:

1. A magneto-optic disk for use in a magneto-optic disk reading system wherein the disk rotates at at least 3,000 revolutions per minute, and wherein the disk comprises:

a substrate and a magneto-optic film disposed on one side of the substrate; and a dampening layer provided on a side of the magneto-optic film opposite the substrate, the dampening layer including a layer of polyester film of at least approximately 102 micrometers thick secured to the disk by an adhesive layer of at least approximately 25.4 micrometers thick, wherein, the adhesive has a chloride content no greater than 1.5 parts per million, and wherein the dampening layer dampens vibrations in the magneto-optic disk, the vibrations having a frequency of at least 850 Hz.

2. A magneto-optic disk for use in a magneto-optic disk reading system wherein the disk rotates at at least 3,000 revolutions per minute, and wherein the disk comprises:

a substrate and a magneto-optic film disposed on one side of the substrate; and a dampening layer provided on the side of the magneto-optic film opposite the substrate, the dampening layer including a layer of polyester film of at least approximately 102 micrometers thick secured to the disk by an adhesive layer of at least approximately 25.4 micrometers thick, wherein, the adhesive is selected from the group consisting of isooctyl acrylate-acrylic acid polymers, isooctylacrylate-acrylamide polymers, and isooctylacrylate-methacrylic acid polymers, and wherein the dampening layer dampens vibrations in the magneto-optic disk, the vibrations having a frequency of at least 850 Hz.

3. A method of using a dampening layer for dampening vibrations of a magneto-optic disk rotating at least 3,000 revolutions per minute, wherein the disk has a vibrational frequency of at least 850 HZ, the method comprising:

applying a dampening layer to the disk on the single recording side, the dampening layer comprising an adhesive layer and a film layer secured by the adhesive layer, wherein the adhesive layer has a chloride content no greater than 1.5 parts per million, and wherein the film layer is made of a material selected from the group consisting of polyester, polyimide, and aluminum foil.

4. A method of using a dampening layer for dampening vibrations of a magneto-optic disk rotating at at least 3,000 revolutions per minute, wherein the disk has a vibrational frequency of at least 850 HZ, the method comprising:

applying a dampening layer to the disk on the single recording side, the dampening layer comprising an adhesive layer and a film layer secured by the adhesive layer, wherein the adhesive is selected from the group consisting of isooctylacrylate-acrylic acid polymers, isooctylacrylate-acrylamide polymers, and isooctylacrylate-methacrylic acid polymers, and wherein the film layer is made of a material selected from the group consisting of polyester, polyimide, and aluminum foil.

5. In a magneto-optic disk reading system, a magneto-optic disk rotating at at least 3,000 revolutions per minute, wherein the disk comprises:

a substrate and a magneto-optic film disposed on one side of the substrate; and a dampening layer provided on a side of the magneto-optic film opposite the substrate, the dampening layer including a layer of polyester film of at least approximately 102 micrometers thick secured to the disk by an adhesive layer of at least approximately 25.4 micrometers thick, wherein the adhesive has a chloride content no greater than 1.5 parts per million, and wherein the dampening layer dampens vibrations in the magneto-optic disk the vibrations having a frequency of at least 850 Hz.

6. In a magneto-optic disk reading system, a magneto-optic disk rotating at at least 3,000 revolutions per minute, wherein the disk comprises:

a substrate and a magneto-optic film disposed on one side of the substrate; and a dampening layer provided on a side of the magneto-optic film opposite the substrate, the dampening layer including a layer of polyester film of at least approximately 102 micrometers thick secured to the disk by an adhesive layer of at least approximately 25.4 micrometers thick, wherein the adhesive is selected from the group consisting of isooctylacrylate-acrylic acid polymers, isooctylacrylate-acrylamide polymers, and isooctylacrylate-methacrylic acid polymers, and wherein the dampening layer dampens vibrations in the magneto-optic disk, the vibrations having a frequency of at least 850 Hz.

* * * * *

UNITED STATES PATENT AND TRADEMARK OFFICE
CERTIFICATE OF CORRECTION

PATENT NO.: 5,458,940

DATED: October 17, 1995

INVENTOR(S): Edward J. Woo

It is certified that error appears in the above-identified patent and that said Letters Patent is hereby corrected as shown below:

In column 3, TABLE 1A, the adhesive listed in both Samples 8 and 9, "Polystyrene-Polyisobutelene", should read --Polystyrene-Polyisobutylene--.

In column 5, TABLE 1B, the adhesive listed in both Samples 8 and 9, "Polystyrene-Polyisobutelene", should read --Polystyrene-Polyisobutylene--.

In column 5, line 38, "manufactured-by" should read --manufactured by--.

In column 6, line 41, "Table" should read --Tables--.

In column 6, TABLE 2 footnote, "Company." should read --Company of St. Paul, Minnesota.--

In column 8, line 18, "applied" should read --applier--.

In column 8, TABLE 4, the adhesive listed in Sample 4, "Polyisobutelene", should read --Polyisobutylene--.

In column 10, line 36, "disk the" should read --disk, the--.

Signed and Sealed this

Seventeenth Day of September, 1996

Attest:

BRUCE LEHMAN

Attesting Officer

Commissioner of Patents and Trademarks